(12) United States Patent
Durkac et al.

(10) Patent No.: US 12,338,760 B2
(45) Date of Patent: Jun. 24, 2025

(54) PRESSURE CONTROL IN AN EXHAUST AFTERTREATMENT SYSTEM

(71) Applicant: Robert Bosch GmbH, Stuttgart (DE)

(72) Inventors: Viktor Durkac, Ceske Budejovice (CZ); Lukas Cierny, Ceske Budejovice (CZ); Vojtech Novotny, Jihlava (CZ)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/941,191

(22) Filed: Nov. 8, 2024

(65) Prior Publication Data

US 2025/0154889 A1 May 15, 2025

(30) Foreign Application Priority Data

Nov. 10, 2023 (DE) ...................... 10 2023 211 165.9

(51) Int. Cl.
*F01N 3/20* (2006.01)

(52) U.S. Cl.
CPC .......... *F01N 3/208* (2013.01); *F01N 2390/02* (2013.01); *F01N 2550/05* (2013.01); *F01N 2610/02* (2013.01); *F01N 2610/144* (2013.01); *F01N 2610/1446* (2013.01); *F01N 2610/148* (2013.01); *F01N 2900/0418* (2013.01); *F01N 2900/0421* (2013.01); *F01N 2900/0422* (2013.01); *F01N 2900/1808* (2013.01)

(58) Field of Classification Search
CPC .. F01N 3/208; F01N 2390/02; F01N 2550/05; F01N 2610/02; F01N 2610/144; F01N 2610/1446; F01N 2610/148; F01N 2900/0418; F01N 2900/0421; F01N 2900/0422; F01N 2900/1808
USPC .................................. 60/277, 286, 295, 301
See application file for complete search history.

(56) References Cited

U.S. PATENT DOCUMENTS

2004/0060286 A1* 4/2004 Huber ................ B01D 53/9431
60/285

* cited by examiner

*Primary Examiner* — Jorge L Leon, Jr.
(74) *Attorney, Agent, or Firm* — Michael Best & Friedrich LLP (57) ABSTRACT

An exhaust aftertreatment system comprises: a transfer pump for conveying the reactant, a supply line for supplying the reactant to the exhaust stream, wherein the supply line has a fluid connection to the transfer pump, a pressure regulator designed to adjust the flow rate of the transfer pump depending on the pressure of the reactant in the supply line by way of a controller having at least one integral component. A method for controlling pressure in a supply line for supplying reactant includes the steps of: sensing the pressure of the reactant in the supply line, detecting whether a pressure curve of the pressure of the reactant in the supply line characteristic for the occurrence of air bubbles in the reactant occurs, and performing a reset of the integral component as a function of the detection of a pressure curve characteristic for the occurrence of air bubbles.

13 Claims, 5 Drawing Sheets

PRESSURE CONTROL IN AN EXHAUST AFTERTREATMENT SYSTEM

BACKGROUND

The invention relates to a method for controlling pressure in a pressurized supply line for supplying reactant for selective catalytic reduction. The invention also relates to a pressure regulator for controlling the pressure in a pressurized supply line for supplying reactant. Moreover, the invention relates to an exhaust aftertreatment system for exhaust aftertreatment in an exhaust stream by selective catalytic reduction. The invention also relates to an exhaust system of an automotive vehicle comprising an exhaust aftertreatment system, and to an automotive vehicle comprising an exhaust system having an exhaust aftertreatment system.

In exhaust aftertreatment systems, the amount of nitrogen oxides contained in the exhaust stream is reduced by means of a selective catalytic reduction (SCR). In such exhaust aftertreatment systems, for instance, a delivery system can be provided that supplies the reactant required for the catalytic conversion to the exhaust stream. It has been discovered that in the current use of control of the pressure of the reactant, pressure spikes occur that are caused by the intrusion of air.

SUMMARY

It is therefore the object of the invention to provide improved control of the pressure at which the reactant is held, thereby avoiding such pressure spikes.

The invention relates to methods for controlling pressure in a pressurized supply line for supplying reactant for selective catalytic reduction to an exhaust stream in an exhaust aftertreatment system, wherein the exhaust aftertreatment system comprises:
  a transfer pump for conveying the reactant,
  the supply line for supplying the reactant to the exhaust stream, wherein the supply line has a fluid connection to the transfer pump,
  a pressure regulator designed to adjust the flow rate of the transfer pump depending on the pressure of the reactant in the supply line by way of a controller having at least one integral component,
  wherein the method comprises the following steps:
  sensing the pressure of the reactant in the supply line,
  detecting whether a pressure curve of the pressure of the reactant in the supply line characteristic for the occurrence of air bubbles in the reactant occurs,
  performing a reset of the integral component as a function of the detection of a pressure curve characteristic for the occurrence of air bubbles.

The pressure increase observed in the solutions of the prior art when air bubbles occur can in particular be caused by the integral component of the regulator. The solution according to the embodiments of the invention therefore proposes to detect the pressure curve of the pressure of the reactant that is characteristic for the occurrence of air bubbles and to perform a reset of the integral component of the regulator each time this characteristic pressure curve occurs. In this way, for example, it can be possible for the pressure regulator to react faster than with previous solutions to the pressure increase associated with the occurrence of air bubbles. In particular, it can be possible, for example, for the pressure to be readjusted to the target value by the pressure regulator within a short time.

Thus, it is particularly possible to avoid pressure spikes of the reactant in the reactant supply line. In particular, this may also prevent, for example, the exhaust aftertreatment system from completely or partially shutting down as a result of pressure spikes. The reactant may be a reaction solution, for example. Avoiding pressure spikes can, for example, reduce hydraulic stress on the components of the exhaust aftertreatment system. Thus, for example, the service life of the components of the exhaust aftertreatment system, in particular the delivery system and the dosing device, may be extended. In addition, for example, improved dosing accuracy may be achieved.

The invention also relates to a pressure regulator for controlling pressure in a pressurized supply line for supplying reactant for selective catalytic reduction to an exhaust stream in an exhaust aftertreatment system, wherein the exhaust aftertreatment system comprises a transfer pump for conveying the reactant through a fluid connection to the supply line, wherein the pressure regulator is designed to
  control the flow rate of the transfer pump as a function of the pressure of the reactant in the feed line by means of a control comprising at least one integral component,
  detect a pressure curve of the pressure of the reactant in the supply line characteristic for the occurrence of air bubbles in the reactant, and
  perform a reset of the integral component as a function of the detection of a pressure curve characteristic for the occurrence of air bubbles.

Moreover, the invention relates to an exhaust aftertreatment system for exhaust aftertreatment in an exhaust stream by selective catalytic reduction, wherein the exhaust aftertreatment system comprises:
  a transfer pump for conveying the reactant,
  a supply line for supplying the reactant to the exhaust stream, wherein the supply line has a fluid connection to the transfer pump,
  a pressure regulator designed to control the flow rate of the transfer pump depending on the pressure of the reactant in the supply line by way of a controller comprising at least one integral component,
  wherein the pressure regulator is designed to
  detect a pressure curve of the pressure of the reactant in the supply line characteristic for the occurrence of air bubbles in the reactant, and
  perform a reset of the integral component as a function of the detection of a pressure curve characteristic for the occurrence of air bubbles.

Furthermore, the invention relates to an exhaust system of an automotive vehicle comprising an exhaust aftertreatment system as described above.

The invention also relates to a motor vehicle comprising an exhaust system having an exhaust aftertreatment system as described above.

According to a preferred embodiment, the regulator comprises a proportional component and an integral component.

Preferably, the pressure regulator is designed to control the pressure of the reactant in the supply line to a target value of the pressure.

It is advantageous if the pressure regulator is designed to control a speed of the transfer pump depending on the pressure of the reactant in the supply line.

According to a preferred embodiment, detecting the pressure curve characteristic for the occurrence of air bubbles comprises: detecting whether the pressure falls below a lower pressure threshold value, in particular for a predetermined time period. For example, when air bubbles enter the exhaust aftertreatment system, an initial pressure drop may occur. This pressure drop may be sensed by the lower threshold value, for example.

According to a further preferred embodiment, detecting the characteristic pressure curve for the occurrence of air bubbles comprises: detecting whether, first, the pressure falls below a lower pressure threshold value for a predetermined time period, and later whether an upper pressure threshold value is exceeded. When air bubbles occur in the exhaust aftertreatment system, it is typical for the pressure to initially drop and then subsequently increase. This pressure increase may be sensed by the upper threshold value, for example.

It is advantageous if the number of sequential resets of the integral component is limited. In this way, for example, a continuous loop of resets can be avoided.

Preferably, the number of resets performed of the integral component is counted by means of a counter, wherein, in the event that the number of resets performed exceeds a predetermined maximum value, no reset of the integral component is performed for at least a predetermined second time period.

According to a preferred embodiment, in the event that the number of resets performed exceeds a predetermined maximum value, a time interval is started, wherein after the time interval has elapsed, the counter for the number of resets performed is reset.

Preferably, the exhaust aftertreatment system comprises a tank for the reactant.

BRIEF DESCRIPTION OF THE DRAWINGS

Embodiments are explained in more detail below with reference to the accompanying drawings. Shown are.

DETAILED DESCRIPTION

Figure 1:
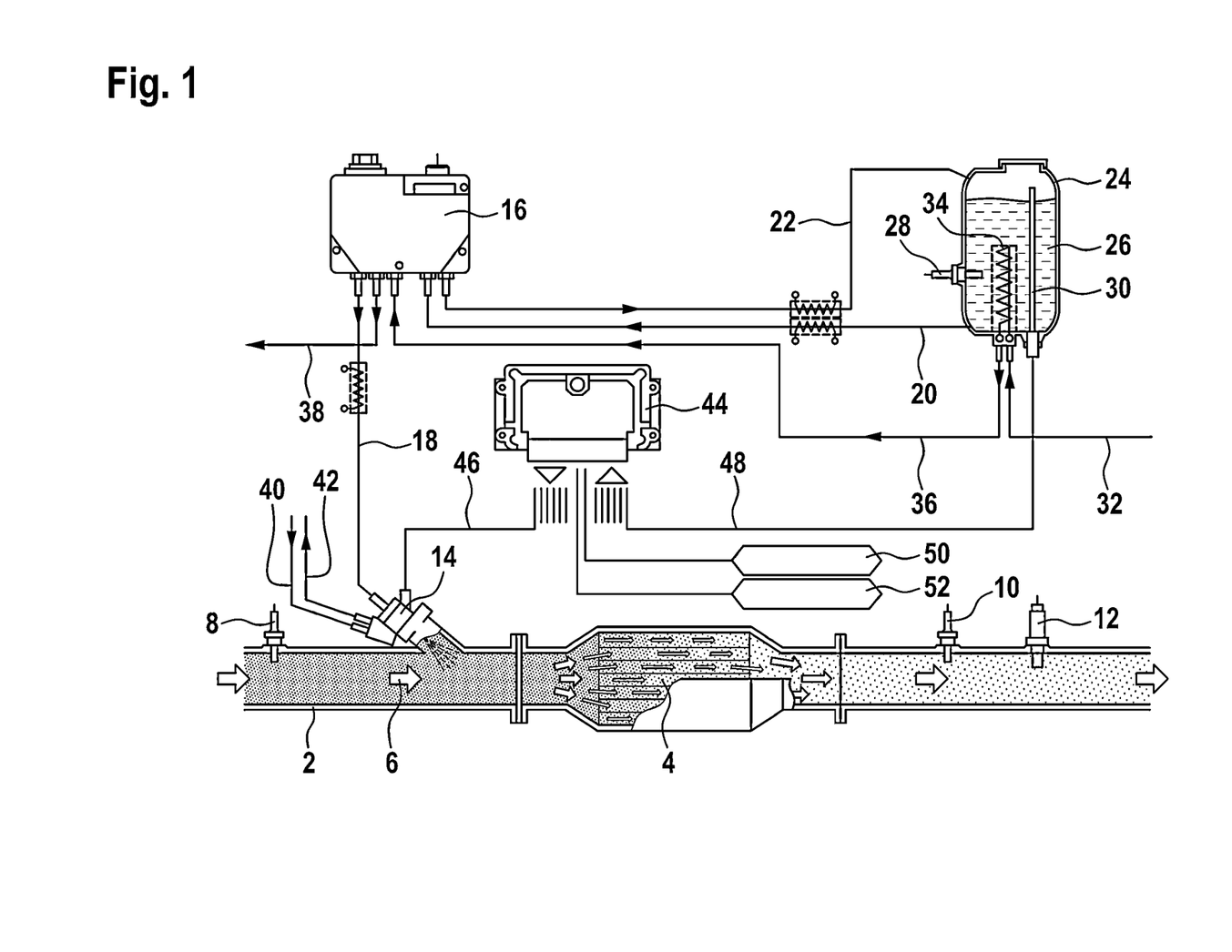
FIG. 1 an exhaust aftertreatment system.

FIG. 1 shows an exhaust aftertreatment system, particularly for a diesel engine, that is particularly designed to reduce the level of nitrogen oxides in the exhaust gases of the engine by means of a selective catalytic reduction (SCR). To perform the selective catalytic reduction, a reactant is added to the exhaust stream, in particular a reaction solution, for example an aqueous urea solution known as "AdBlue".

The exhaust aftertreatment system shown in FIG. 1 includes an exhaust conduit 2 as well as a catalytic converter 4, wherein an exhaust stream 6 flows through the exhaust conduit 2 and the catalytic converter 4. The catalytic converter 4 is designed to catalyze the conversion of nitrogen oxides contained in the exhaust stream 6 with the supplied reactant, wherein nitrogen and water are obtained as a result of this conversion. The temperature and the nitrogen oxide content of the exhaust gases are monitored by means of a first temperature sensor 8, a second temperature sensor 10 and a NOx sensor 12.

A dosing unit 14 is provided at the exhaust line 2 for supplying the reactant to the exhaust stream 6. For example, the dosing unit 14 may be configured to spray the reactant into the exhaust stream 6. A delivery system 16 has a fluid connection to the dosing unit 14 via a supply line 18. The delivery system 16 is designed to deliver the reactant via the supply line 18 to the dosing unit 14. The flow rate is thereby controlled so that the pressure in the supply line 18 is regulated to a predetermined target value, for example to 9 bar. The delivery system 16 has a fluid connection to a tank 24 containing a volume 26 of reactant via an intake line 20 and a return line 22.

The reactant contained in tank 24 is supplied to the delivery system 16 via the intake line 20 and conveyed from the delivery system 16 to the dosing unit 14. Excess reactant passes back to tank 24 via the return line 22. A third temperature sensor 28 is disposed in the wall of tank 24 and is designed to measure the temperature of the reactant. In addition, a level sensor 30 is attached to or in the tank 24.

To preheat the volume 26 of reactant contained in the tank 24, coolant heated by the engine is fed via a first coolant line 32, a heating element 34, and a second coolant line 36. Coolant is then passed through the second coolant line 36 through the delivery system 16 and discharged through the third coolant line 38 to heat up the reactant within the delivery system 16.

The dosing unit 14, which is strongly heated by the exhaust stream 6 passing by it, is cooled with the aid of the engine coolant. To cool the dosing unit 14, the engine coolant is fed through the coolant supply line 40, the dosing unit 14, and the coolant return line 42.

Optionally, a dosing control unit 44 may be provided to control the dosing unit 14. The dosing control unit 44 is designed to transmit control signals 46 to at least one actuator, in particular to the dosing unit 14. Moreover, the dosing control unit 44 is designed to receive and evaluate sensor signals 48 from at least one sensor, for example, from the level sensor 30. The dosing control unit 44 may also be connected to an engine CAN bus 50 and/or to a diagnostic CAN bus 52.

Figure 2:
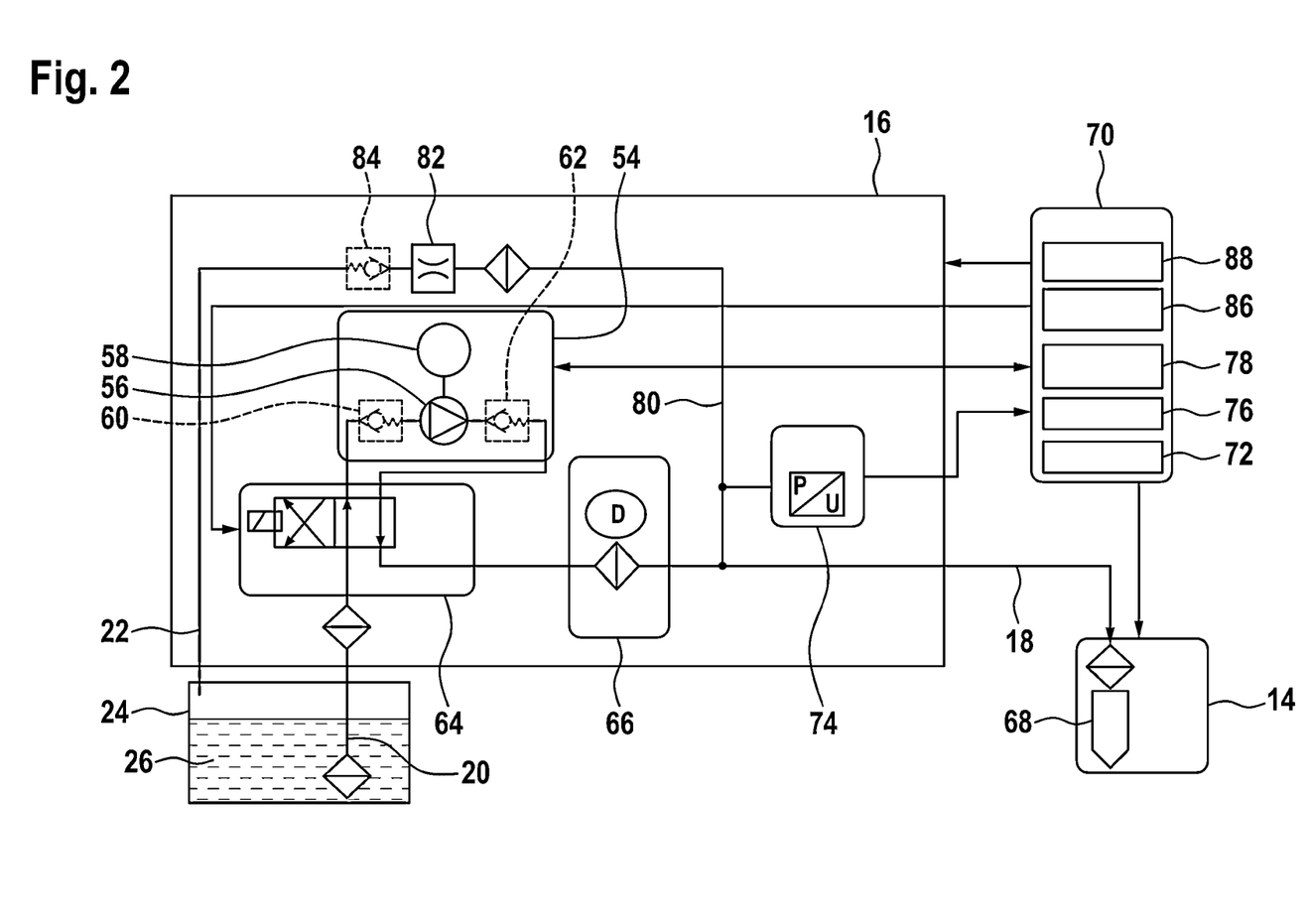
FIG. 2 a more detailed illustration of the exhaust aftertreatment system.

FIG. 2 shows the operation of the exhaust aftertreatment system shown in FIG. 1 in further detail. FIG. 2 shows the delivery system 16, which includes a transfer pumping unit 54 having a pump 56 driven by a pump motor 58. The transfer pumping unit 54 may optionally be equipped with an intake valve 60 and an exhaust valve 62. During operation, the transfer pumping unit 54 draws the reactant stored in the tank 24 via the intake line 20. The drawn reactant is conveyed through the changeover valve 64, the transfer pumping unit 54, then through the changeover valve 64 again, and passes through a pressure damper 66 and the supply line 18 to the dosing unit 14. The dosing unit 14 comprises a dosing valve 68.

A control unit 70 is provided to control the flows in the exhaust aftertreatment system. The control unit 70 includes, among other things, a dosing valve controller 72 for controlling the dosing valve 68. For example, the dosing valve controller 72 may be configured as part of the dosing control unit 44 shown in FIG. 1.

A pressure sensor 74 is provided in the delivery system 16 and is designed to sense the pressure of the reactant in the supply line 18. A pressure sensor signal generated by the pressure sensor 74 is supplied to the control unit 70 and evaluated there by a pressure signal evaluation 76. The pressure signal evaluation 76 is designed to determine the actual value of the pressure in the supply line 18 based on the pressure sensor signal.

The control unit 70 also comprises a pressure regulator 78 designed to control the flow rate of transfer pumping unit 54 as a function of a predetermined pressure target value and the actual pressure value provided by the pressure signal evaluation 76 such that the pressure in the supply line 18 approaches the target value. The pressure regulator 78 is designed to generate and transmit a suitable control signal for the transfer pump unit 54. For example, the speed of the transfer pumping unit 54 may be adjusted as a function of the control signal.

The supply line 18 has a fluid connection to a return line 80. Via the return line 80, a return choke 82, and an optionally provided stop valve 84, the reactant may be delivered back to the tank 24 by the supply line 18 as needed.

The control unit 70 also includes a changeover valve controller 86 for the changeover valve 64. When the changeover valve 64 is in the position shown in FIG. 2, reactant is conveyed from the tank 24 to the supply line 18. By actuating the changeover valve 64, the delivery direction can be reversed to deliver reactant back to the tank 24, for example, from the supply line 18.

Moreover, the control unit 70 comprises a heating control 88 for the delivery system 16, wherein the heating control 88 is designed to hold the delivery system 16 at a predetermined temperature.

The pressure regulator 78 will be discussed in more detail in the following section. As has been described above, the pressure regulator 78 is designed to control the pumping output of the transfer pumping unit 54 depending on the target value of the pressure and the actual value of the pressure such that the pressure in the supply line 18 approaches the target value. A proportional integral regulator is preferably used to regulate the pumping power, the regulation of which has a proportional component and an integral component. Such regulators are also referred to as PI regulators.

It is already provided for the PI regulators currently used to perform a reset of the integral component in certain situations, i.e. to reset the integral component of the PI regulator to zero in certain situations. In the PI regulators presently used in the prior art, it is provided on the one hand to reset the integral component at the start of conveying the reactant, for example when the vehicle is started. In addition, it is provided that the integral component is reset each time a system check for detecting hydraulic blockages is performed.

During operation, it is possible for air to enter the delivery system 16 from the tank 24 via the intake line 20. In this case, the performance of the transfer pump unit 54 is significantly affected by the air.

As a result of the intrusion of air, the pressure in the supply line 18 initially drops. The integral component of the PI regulator then sets a higher speed of the transfer pump unit 54 (up to a maximum limit) to bring the pressure back to the target value. However, once the air has escaped from the delivery system 16, a rapid increase in pressure occurs to values above the target value of, for example, 9 bar, because the regulator cannot react quickly enough to the pressure increase due to the integral component of the control, and the speed of the transfer pumping unit 54 cannot be reduced quickly enough.

Typically, the occurrence of air bubbles in the delivery system 16 initially results in a reduction in the pressure in the supply line 18, wherein a sudden sharp increase in pressure then follows this pressure drop as a result of the behavior of the PI regulator.

Figure 3:
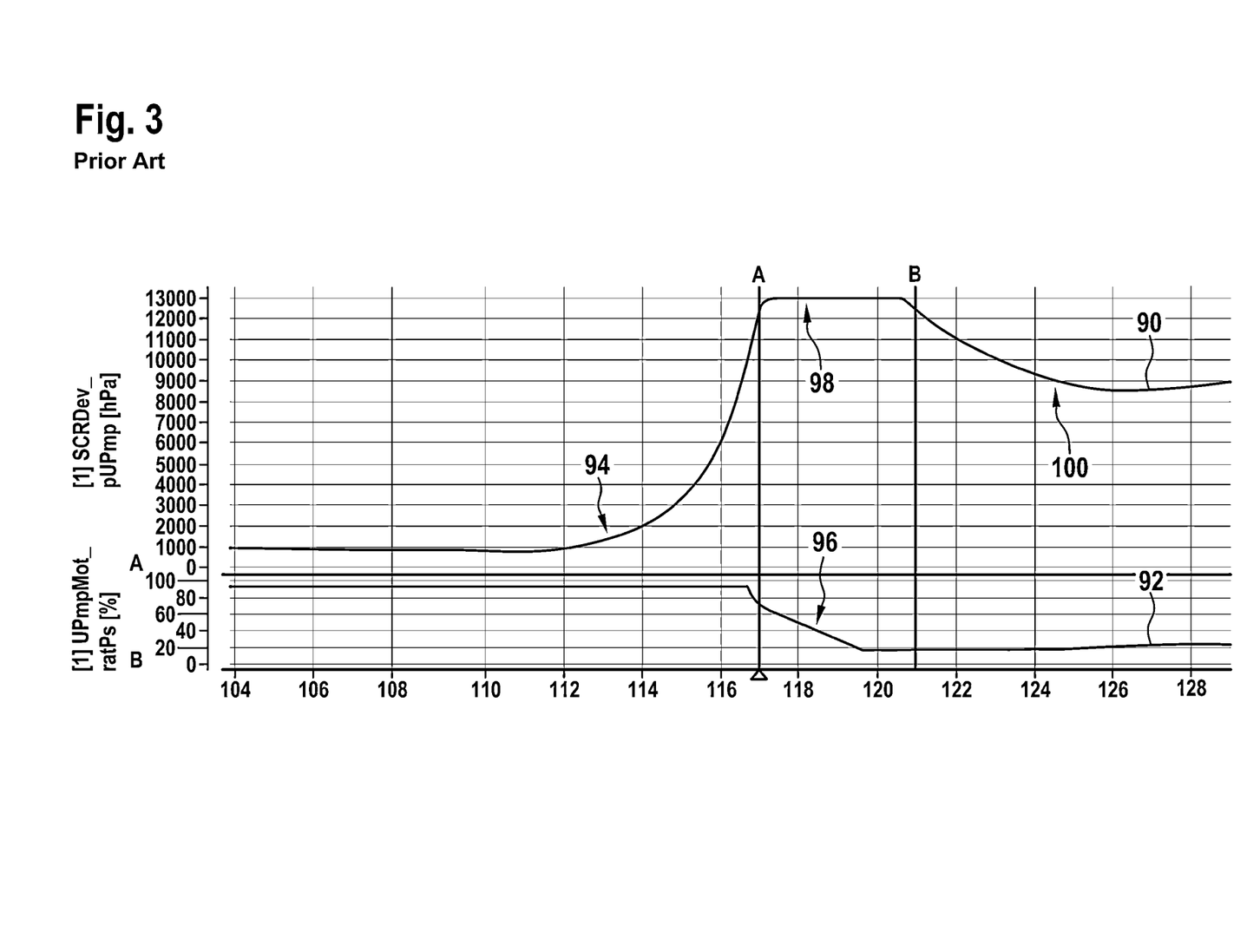
FIG. 3 the pressure of the reactant and the speed of the transfer pump unit as a function of time in a solution of the prior art.

FIG. 3 shows this sudden pressure increase currently observed in the pressure regulators of the prior art. The pressure curve 90 indicates the pressure of the reactant in supply line 18 as a function of time, whereas the curve 92 shows the speed of the transfer pumping unit 54 as a function of time. After the air bubbles have left the delivery system 16 once again, a pressure increase occurs as shown by the arrow 94. The pressure here rises to values significantly above the nominal pressure of 9 bar. Once the nominal pressure of 9 bar is exceeded, the speed of the transfer pumping unit 54 is decreased, as shown in FIG. 3 by the arrow 96. However, as a result of the integral component of the regulator, the speed only decreases slowly. In the pressure curve 90, it can be seen that the pressure increase during the phase 98 is gradually adjusted. Subsequently, the pressure in the region marked by the arrow 100 slowly drops back to the nominal pressure. However, even in the region marked by the arrow 100, stable pressure ratios are not yet achieved.

The pressure increase shown in FIG. 3 causes several problems: As a result of the rapid increase in pressure, the pressure in the hydraulic system becomes too high. Generally, the pressure spikes result in a higher level of stress throughout the hydraulic system. If the pressure reaches a pressure above the threshold value of 12.5 bar set for the components for a period of time of more than 5 seconds, there is even the possibility that the system may shut down. Moreover, the pressure spikes may reduce the service life of the components, particularly the service life of the delivery system 16 and the dosing unit 14. The dosing accuracy can also be affected by the excess pressure, which, for example, can lead to higher dosing amounts. These drawbacks can lead to customer complaints.

In order to avoid these disadvantages, the solution according to the embodiments of the invention provides for detecting the occurrence of air bubbles in the supply line and, when air is detected, causing a reset of the integral component of the pressure regulator. By resetting the integral component to zero, the strong pressure increase observed in previous solutions of the prior art, which was in particular caused fully or partially by the integral component of the regulator, can be avoided or reduced. The pressure in the supply line can thus be adjusted to the target value again in a comparatively short time.

Preferably, to detect the occurrence of air bubbles in the supply line 18, it is provided that the pressure is monitored in order to check whether a pressure curve characteristic for the occurrence of air bubbles occurs. When air enters the supply line 18 via the intake line 20 and the transfer pumping unit 54, this initially causes a pressure drop. The pressure regulator reacts to this pressure drop by increasing the flow rate of the transfer pumping unit 54, resulting in a pressure increase in the supply line 18.

This characteristic pressure profile may preferably be detected using two threshold values, a lower threshold value and an upper threshold value, wherein when air occurs in the system, the pressure initially falls below the lower threshold value and then the upper threshold value is subsequently exceeded. In order to reliably detect an event, the pressure should preferably be below the lower threshold value at least for a predetermined first time period t1, wherein the first time period t1 can be detected by means of a timer provided for this purpose. For example, the first time period t1 may be set at 1 second. In this way, detection of events is rendered insensitive to short pressure fluctuations, which may be caused, for example, by a stiff system during long travel times of more than four hours or by high dosing requirements. When the upper threshold value is exceeded, this then triggers the reset of the integral component of the regulator in order to avoid a further sharp increase in pressure.

Figure 4:
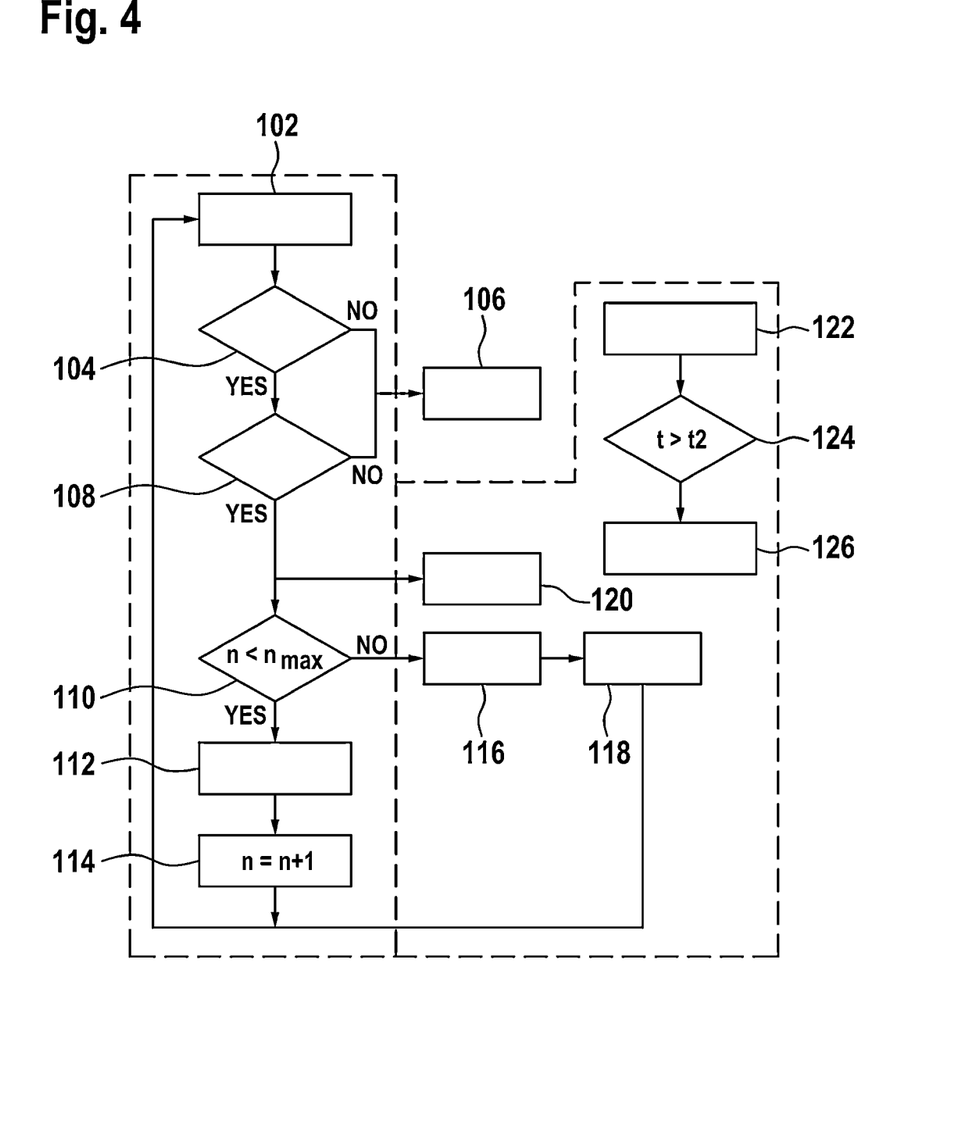
FIG. 4 a flow chart of a method for pressure control.

The method for pressure regulation is shown in the flow chart of FIG. 4. The method starts with step 102. In the query step 104, it is queried whether the current pressure of the reactant in the supply line 18 is at least below the lower threshold value and thus also below the upper threshold value for a first time period t1. If this is not the case, there is no event and the method is ended in step 106. Conversely, if, in the query step 104, it is determined that the pressure is below the lower threshold value during at least the first time period t1, then it is determined in the subsequent query step 108 whether a pressure increase then occurs to a pressure above the upper threshold value. If this is not the case, there is no event and the method ends in step 106. Conversely, if the upper threshold value is exceeded, an event exists. It is then to be assumed that air bubbles have entered the system. Accordingly, a reset of the integral component of the regulator should now be performed.

However, in the event that air is in the system, a continuous loop of resets of the integral component should be avoided. To avoid this, the number of consecutive resets is limited to a maximum value $n_{max}$, for example $n_{max}=3$. The pressure regulator comprises a counter that counts the number n of successive resets performed of the integral component. A reset of the integral component is only performed if the number n of resets already previously performed is below the maximum value $n_{max}$. In this respect, it is queried in query step 110 whether $n<n_{max}$. If $n<n_{max}$, a reset of the integral component of the regulator is performed in step 112. In step 114, the number n of resets already performed is then incremented by one.

However, if the query in query step 110 determines that the number n of resets already performed is greater than or equal to the maximum value $n_{max}$, then in step 116 the counter reading n, which indicates the number of resets already performed, is reset to zero, and in step 118, all further resets for a second time period t2 are blocked. This second time period t2 may be set at 30 seconds, for example.

Each time an event is detected, a timer for the second time period t2 is started in step 120. This timer is queried in step 122. In the query step 124, it is determined whether the time t since the occurrence of the event is greater than the second time period t2. If this is the case, the counter reading n, which indicates the number of resets already performed, is reset to zero in step 126. From now on, further resets of the integral component of the regulator can be carried out once again. The purpose of the time-dependent resetting of the counter is to consider one or more air bubbles that enter the delivery system within the time period of e.g. 30 seconds as an "event."

In FIG. 4, the second time period used in step 118 corresponds to t2, during which the resets of the integral component of the regulator are blocked, the second time period t2 used in query step 124 is reset to zero after the counter level n has expired. As an alternative to this solution, different time periods could also be used for blocking the resets and for resetting the reset counter.

Figure 5:
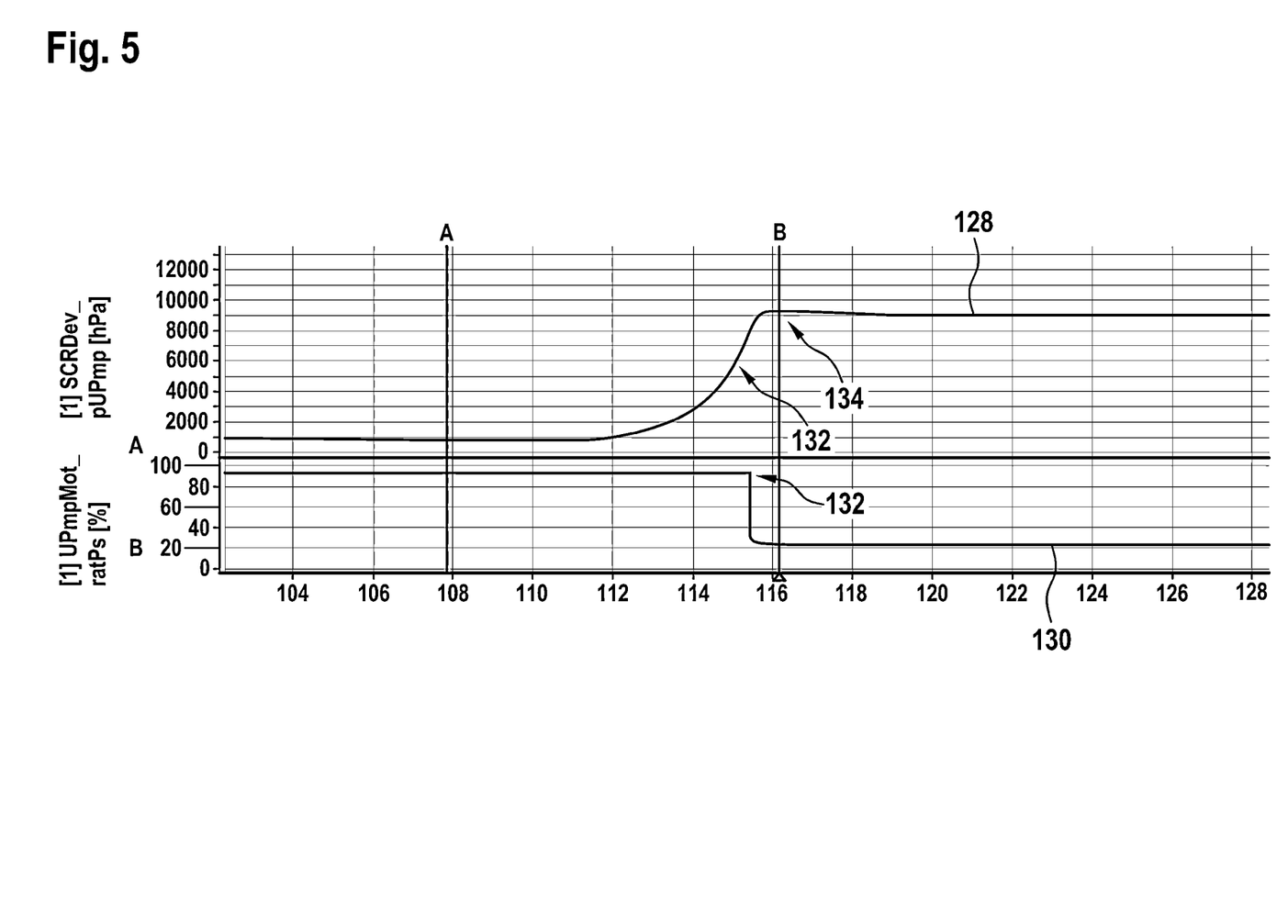
FIG. 5 the pressure of the reactant and the speed of the transfer pump unit as a function of time using the method shown in FIG. 4.

FIG. 5 shows a pressure curve 128 showing the pressure in the feed line as a function of time, and a curve 130 showing the speed of the transfer pumping unit 54 as a function of time. FIG. 5 shows how the exhaust aftertreatment system reacts to the occurrence of air bubbles using the method shown in FIG. 4. The arrows 132 indicate the time at which a reset of the integral component of the regulator is performed. It can be seen that already at the time indicated by arrow 134 a stable pressure of the reactant is achieved in the range of ±400 hPa around the target value.

The features disclosed in the foregoing description, claims and drawings may be of importance, both individually and in any combination, for the realization of the invention in its various embodiments.

The invention claimed is:

1. A method for controlling a pressure in a pressurized supply line (18) for supplying reactant for a selective catalytic reduction to an exhaust stream (6) in an exhaust aftertreatment system, wherein the exhaust aftertreatment system includes: a transfer pump (54) configured to convey the reactant, the supply line (18), and a pressure regulator (78) configured to adjust a flow rate of the transfer pump (54), the method comprising:
   sensing the pressure of the reactant in the supply line (18),
   detecting whether a pressure curve of the pressure of the reactant in the supply line (18) indicative of air bubbles in the reactant is present,
   resetting an integral component of the pressure regulator (78) when the pressure curve is detected, and
   adjusting the pressure of the reactant in the supply line (18) to a target pressure when the integral component is reset.

2. The method according to claim 1, wherein the pressure regulator (78) further includes a proportional component.

3. The method according to claim 1, further comprising:
   controlling a speed of the transfer pump (54) based on the sensed pressure.

4. The method according to claim 1, wherein the pressure curve is detected when the sensed pressure falls below a lower pressure threshold value for a first predetermined time period.

5. The method according to claim 1, wherein the pressure curve is detected when the sensed pressure falls below a lower pressure threshold value for a first predetermined time period and subsequently exceeds an upper pressure threshold value.

6. The method according to claim 1, further comprising:
   limiting a number of successive resets of the integral component to a predetermined maximum value.

7. The method according to claim 1, further comprising:
   counting a number of resets of the integral component during a second predetermined time period via a counter, and
   inhibiting subsequent resets of the integral component when the number of resets reaches a predetermined maximum value during the second predetermined time period.

8. The method according to claim 7, further comprising:
   starting a predetermined time interval when the number of resets reaches the predetermined maximum value, and
   resetting the counter when the predetermined time interval has elapsed.

9. The method according to claim 1, wherein the exhaust aftertreatment system further includes a tank (24) configured to store the reactant.

10. A pressure regulator (78) for controlling a pressure of a selective catalytic reduction reactant in a pressurized feed line (18) of an exhaust aftertreatment system including a transfer pump (54) configured to convey the reactant to an exhaust stream (6) via the feed line (18), the pressure regulator (78) configured to:
   control a flow rate of the transfer pump (54) based on the pressure of the reactant in the feed line (18) via at least one integral component, monitor the pressure for a pressure curve characteristic indicative of air bubbles being present in the supply line (18), reset the at least one integral component when the pressure curve characteristic is detected, and adjust the pressure to a target pressure when the at least one integral component is reset.

11. An exhaust aftertreatment system comprising:

a transfer pump (54) configured to convey a selective catalytic reduction reactant, a supply line (18) fluidly connected to the transfer pump (54), the supply line (18) configured to supply the reactant to an exhaust stream (6), and a pressure regulator (78) configured to:

control a flow rate of the transfer pump (54) based on a pressure of the reactant in the supply line (18) via at least one integral component, monitor the pressure for a pressure curve characteristic indicative of air bubbles being present in the supply line (18), reset the at least one integral component when the pressure curve characteristic is detected, and adjust the pressure to a target pressure when the at least one integral component is reset.

12. An exhaust system of an automotive vehicle, the exhaust system comprising the exhaust aftertreatment system according to claim 11.

13. A motor vehicle comprising the exhaust system according to claim 12.

\* \* \* \* \*